United States Patent
Hicks et al.

(10) Patent No.: US 9,262,193 B2
(45) Date of Patent: Feb. 16, 2016

(54) MULTI-TIER PLATFORM-AS-A-SERVICE DEPLOYMENT REDUCED TO SINGLE-TIER ARCHITECTURE FOR DEVELOPMENT

(71) Applicant: Red Hat, Inc., Raleigh, NC (US)

(72) Inventors: Matthew Hicks, Westford, MA (US); Michael P. McGrath, Schaumburg, IL (US); Daniel C. McPherson, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 318 days.

(21) Appl. No.: 13/690,464

(22) Filed: Nov. 30, 2012

(65) Prior Publication Data
US 2014/0157262 A1  Jun. 5, 2014

(51) Int. Cl.
*G06F 9/455* (2006.01)
*G06F 9/445* (2006.01)
*G06F 11/36* (2006.01)

(52) U.S. Cl.
CPC .............. *G06F 9/45537* (2013.01); *G06F 8/60* (2013.01); *G06F 8/63* (2013.01); *G06F 11/3664* (2013.01)

(58) Field of Classification Search
CPC ......... G06F 9/45537; G06F 8/60; G06F 8/63; G06F 11/3664
USPC ...................................................... 718/1, 104
See application file for complete search history.

(56) References Cited

U.S. PATENT DOCUMENTS

| | | | |
|---|---|---|---|
| 8,645,938 B2 * | 2/2014 | O'Farrell et al. | 717/169 |
| 2011/0231899 A1 * | 9/2011 | Pulier et al. | 726/1 |
| 2012/0047240 A1 * | 2/2012 | Keohane et al. | 709/221 |
| 2013/0227560 A1 * | 8/2013 | McGrath et al. | 718/1 |
| 2014/0040883 A1 * | 2/2014 | Tompkins | 718/1 |

OTHER PUBLICATIONS

An Oracle White Paper "Realize the Full Potential of Virtualid Java Applications" Apr. 2010, pp. 1-12 Online web address: "http://www.oracle.com/us/products/middleware/application-server/wls-virtualization-bwp-067889.pdf".*

* cited by examiner

*Primary Examiner* — Emerson Puente
*Assistant Examiner* — Willy W Huaracha
(74) *Attorney, Agent, or Firm* — Lowenstein Sandler LLP

(57) ABSTRACT

A multi-tier platform-as-a-service (PaaS) deployment reduced to a single-tier architecture for development is disclosed. A method of the disclosure includes mapping multiple tiers of a PaaS system to a consolidated environment executable on a virtual machine (VM), wherein networking stacks of the VM maintain a separation between the multiple tiers in the consolidated environment, and providing the consolidated environment as a development instance of the PaaS system for execution on the VM, the consolidated environment facilitating testing of code changes to the PaaS system.

20 Claims, 5 Drawing Sheets

300

Map tiers of a multi-tier PaaS system to a single consolidated environment executable on a single VM, wherein networking stacks of the VM maintain a functional separation between the multiple tiers in the single consolidated environment
310

Provide the single consolidated environment as a PaaS instance to execute on a VM
320

Receive a code change to the PaaS instance executing in the VM
330

Synchronize the code change to the PaaS instance
340

Identify packages of the PaaS instance to be rebuilt because of the code change
350

Rebuild the identified packages of the PaaS instance
360

Launch the PaaS instance with the rebuilt packages in the VM
370

Figure 3

US 9,262,193 B2

MULTI-TIER PLATFORM-AS-A-SERVICE DEPLOYMENT REDUCED TO SINGLE-TIER ARCHITECTURE FOR DEVELOPMENT

TECHNICAL FIELD

The embodiments of the disclosure relate generally to platform-as-a-service (PaaS) systems and, more specifically, relate to a multi-tier PaaS deployment reduced to a single-tier architecture for development.

BACKGROUND

Currently, a variety of Platform-as-a-Service (PaaS) offerings exist that include software and/or hardware facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware and software and provisioning hosting capabilities, providing all of the facilities required to support the complete life cycle of building and delivering web application and service entirely available from the Internet. Typically, these facilities operate as one or more virtual machines (VMs) running on top of a hypervisor in a host server.

A PaaS offering is generally a complicated product. For example, some PaaS offerings run over multiple machines when deployed in production. Accordingly, development of a PaaS product can be a daunting task, as the PaaS product often times operates over multiple tiers with a variety of interrelated components and protocols. It can take time and resources to bring a developer up to speed on the structure and workings of the PaaS product. Furthermore, changes made to one aspect of a PaaS product may effect a variety of other aspects of the PaaS products, without a developer realizing such an effect.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram illustrating a method for using a multi-tier PaaS deployment that is reduced to a single-tier architecture for development purposes according to an embodiment of the disclosure;

DETAILED DESCRIPTION

Embodiments of the disclosure provide for a multi-tier platform-as-a-service (PaaS) deployment reduced to a single-tier architecture for development. More specifically, a multi-tier architecture of a PaaS product is combined and reduced into a single-tier architecture that can be initialized on a single virtual machine (VM). This is accomplished by maintaining a separation of communication protocols between various tiers of the PaaS product (e.g., broker layer, client layer, node layer) via a networking stack boundary on the VM. A developer and/or programmer can then initialize this single-tier architecture on a single VM for use in development and testing of code changes to the PaaS product code base. Furthermore, in some embodiments, the single-tier architecture is utilized by a Continuous Integration (CI) system to automatically test the code changes to the PaaS product using a battery of tests, without any end user interaction.

In one embodiment, a method includes mapping multiple tiers of a PaaS system to a consolidated environment executable on a virtual machine (VM), wherein networking stacks of the VM maintain a separation between the multiple tiers in the consolidated environment. The method also includes providing the consolidated environment as a development instance of the PaaS system for execution on the VM, the consolidated environment facilitating testing of code changes to the PaaS system.

Figure 1:
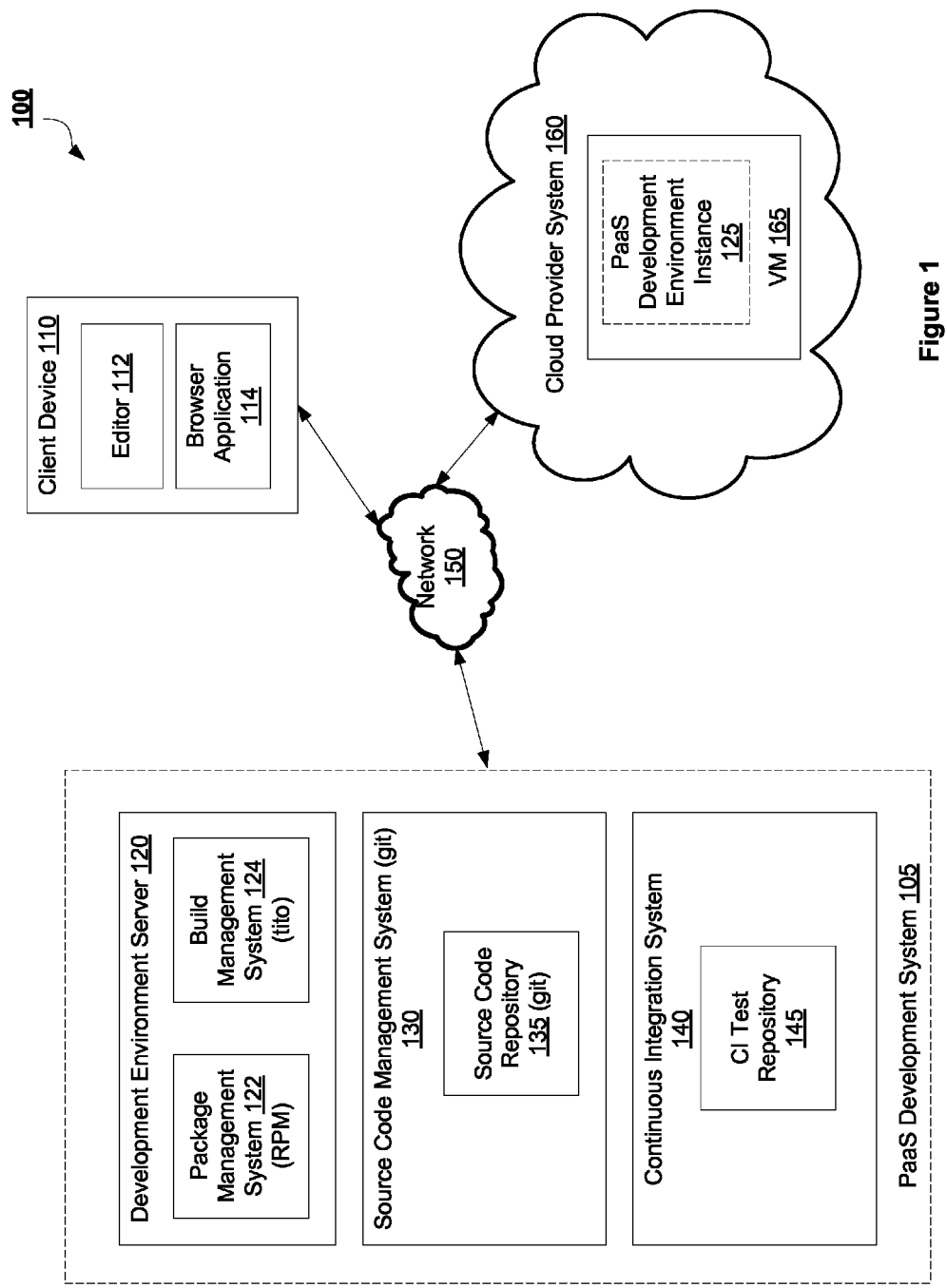
FIG. 1 is a block diagram of a network architecture supporting a multi-tier PaaS deployment reduced to a single-tier architecture for development according to an embodiment of the disclosure.

FIG. 1 is a block diagram of a network architecture 100 supporting a multi-tier PaaS deployment reduced to a single-tier architecture for development according to an embodiment of the disclosure. Network architecture 100 includes a client device 110 communicating with a PaaS development system 105 and a cloud provider system 160 over network 150. The network 150 may include, for example, the Internet in one embodiment. In other embodiments, other networks, wired and wireless, such as an intranet, local area network (LAN), wide area network (WAN), or broadcast network may be used.

The client device 110 may be any type of computing device, for example, a device including a processor, a computer-readable medium, and a memory. The client device 110 may be, for example, a personal computer, a laptop computer, a tablet computer, a personal digital assistant (PDA), a cellular telephone, etc. In some embodiments, the client device 110 may be executing a browser application 114 or other application adapted to communicate over Internet related protocols (e.g., TCP/IP and HTTP) and/or display a user interface. While only a single client device 110 is shown in FIG. 1, network architecture 100 may support a large number of concurrent sessions with many client devices 110.

In one embodiment, client device 110 includes an editor application 112 ("editor") that is used to edit source code of computer programs. An end user of client device 110 may use editor 112 to make and submit code changes to source code of a PaaS product. In one embodiment, the code changes are provided to PaaS development system 105. PaaS development system 105 is a collection of tools, which may be implemented by any combination of hardware, software, and firmware, that are used to build a PaaS product. For example, PaaS development system 105 can include and may be implemented on one or more computing devices including, but not limited to, server devices, desktop computers, laptop computers, mobile devices, and so on.

In one embodiment, the PaaS product that is developed using PaaS development system 105 is a multi-tenant PaaS product hosted in a cloud computing environment. The term "multi-tenant" refers to a feature of the PaaS product that hosts multiple different web applications having multiple different owners on a same virtual machine (VM) in the cloud computing environment. In production, such a multi-tenant PaaS product may execute utilizing multiple computing devices to provide multiple tiers of the PaaS product, with a variety of inter-related components and protocols. For example, the multiple tiers of the PaaS product may include a client layer hosting client tools to access the functionality of the PaaS product, a broker layer having multiple broker machines to coordinate and configure initialization of new end user applications, a node layer including nodes (e.g., VM, physical machine, etc.) to host the applications, messaging servers, a data store of a database, a Domain Name Service (DNS) server, and so on. As a result, development of the PaaS product may be complicated for a programmer and/or a developer.

Embodiments of the invention reduce and combine the multi-tier architecture of a multi-tenant PaaS product to a single-tier architecture that can run on a single VM for use in a development environment, such as PaaS development system 105. The single-tier architecture may provide a stable code base for the PaaS product that can be used by programmers in developing the PaaS product. A stable code base refers to a version of the PaaS product source code that has passed a variety of predetermined tests and has been approved to not cause crashes or data loss. In embodiments of the disclosure, the PaaS development environment stable code base can be changed in response to programmer input specifying code changes, and then an instance 125 of the PaaS development environment stable code base can be launched (e.g., in response to a programmer request) in order to test and verify these code changes against the instance 125.

Figure 2:
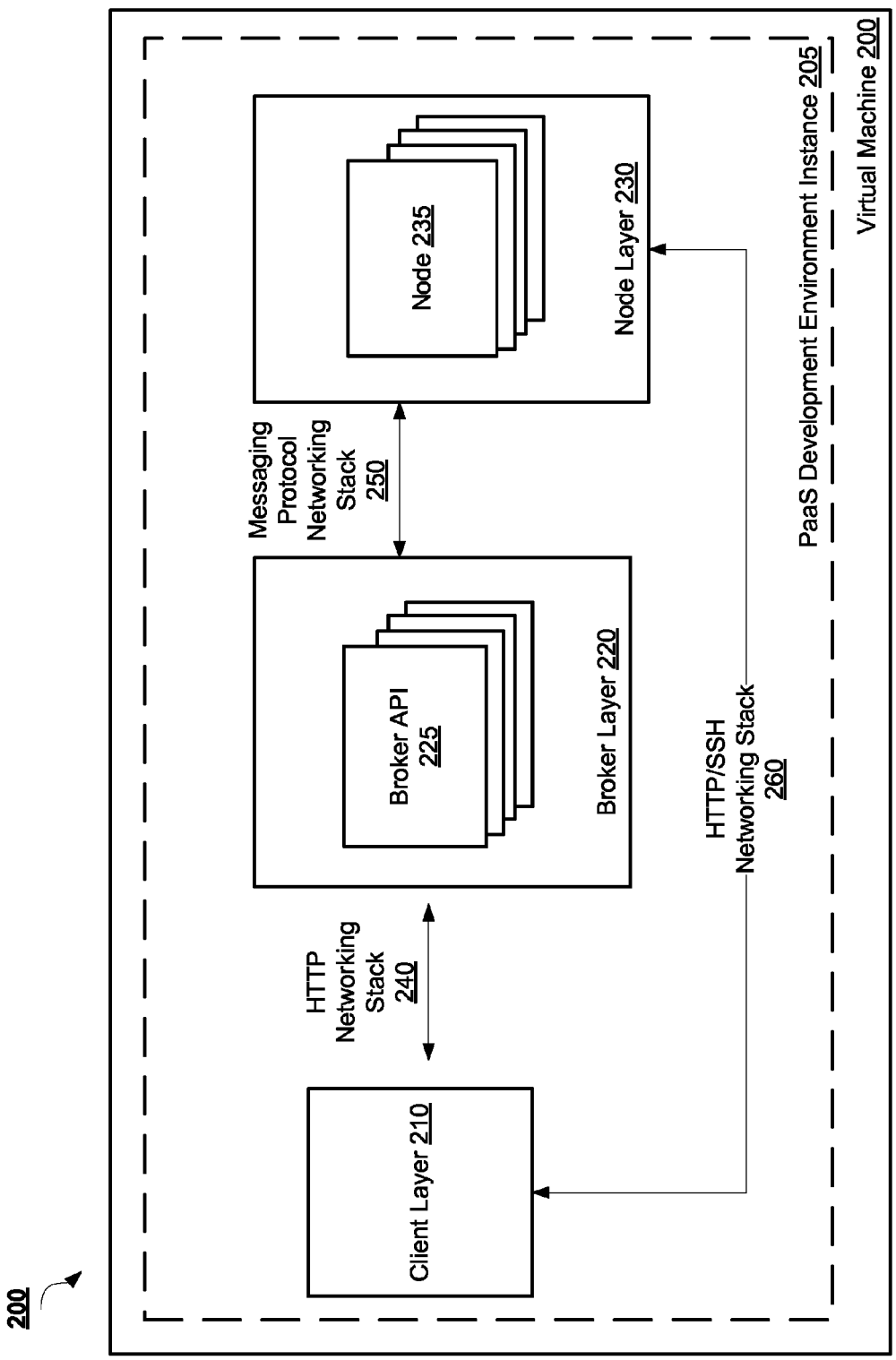
FIG. 2 is a block diagram depicting a virtual machine (VM) executing an instance of PaaS development environment according to an embodiment of the disclosure.

FIG. 2 is a block diagram depicting a VM 200 executing an instance of PaaS development environment 205 according to an embodiment of the disclosure. In one embodiment, VM 200 is the same as VM 165 of FIG. 1 and PaaS development environment instance 205 is the same as PaaS development environment instance 125 of FIG. 1. VM may be executed in a cloud provider system, such as cloud provider system 160 of FIG. 1.

In one embodiment, PaaS development environment instance 205 is initialized from a template image of a stable code base for the PaaS product maintained in a repository provided by a PaaS product provider. In some embodiment, the repository may be kept in the cloud provider system. In other embodiment, the repository may be maintained by the PaaS provider outside of the cloud provider system, such as in a Git repository.

As illustrated, PaaS development environment instance 205 reduces and combines the multiple tiers 210, 220, 230 of a multi-tenant PaaS product to a single-tier architecture executed by the VM 200. The multi-tenant PaaS product, in one embodiment, includes a client layer 210, a broker layer 220, and a node layer 230. In one embodiment, the client layer 210 provides an interface to a user of the PaaS product to a broker layer 220 of the PaaS product. The broker layer 220 may, in turn, facilitate the creation and deployment (via broker Application Programming Interfaces (APIs) 225) of software applications (e.g., web applications) being developed by end users of the PaaS product. The node layer 230 initializes and executes the software applications of the end users on one or more nodes 235.

In one embodiment, the distributed environment of each of the multiple tiers 210, 220, 230 is emulated in the single machine of the VM 200 through use of networking stack functionality of the VM 200. Each tier of the PaaS development environment instance 205 is functionally separated from the other tiers by a network stack boundary. The network stack is the set of protocols used to communicate data between two endpoints. As a result, each tier has knowledge of the other tiers only via the local communications through the network stack boundaries.

A variety of protocols may be implemented in the network stack boundaries between the tiers 210, 220, 230. For example, a HyperText Transport Protocol (HTTP) protocol networking stack 240 may exist for communications between the client layer 210 and the broker layer 220. A messaging-based protocol network stack 250 may exist between the broker layer 220 and the node layer 230. In one embodiment, the messaging-based protocol is Advanced Message Queuing Protocol (AMQP). In another embodiment, the messaging-based protocol is Stream Text Oriented Messaging Protocol (STOMP). In addition, a HTTP networking stack 260 or Secure Shell (SSH) networking stack 260 may exist between the client layer 210 and the node layer 230, which is used for end user communications from the client layer 210 directly to the node layer 230 once applications are established and running on the nodes 235.

In a production-level deployment of the PaaS product, each node 235 is a VM with multiple applications associated with different end users hosted on the VM. However, in the PaaS development environment instance 205 of embodiments of the disclosure, the nodes 235 are all running on the same VM 200 and are functionally separated by networking stack boundaries.

Referring back to FIG. 1, in one embodiment, a programmer using editor 112 on client device 110 may make one or more changes to the source code of a PaaS product, which can be synchronized and verified. To test y these code changes to the PaaS product, an instance of PaaS development environment 125 that executes in a VM 165 provided by a cloud provider system 160 can be launched automatically or in response to a request of the programmer. Cloud provider system 160 provides VMs, such as VM 165, hosted in cloud 160 on physical machines (not shown). The physical machines are configured as part of the cloud 160, and are often located in a data center. Users can interact with applications executing on the cloud-based VMs 165 using client computer systems, such as client device 110, via a corresponding web browser application 114.

Once the launch of the PaaS development environment instance 125 is verified, the programmer may then access the code base of the instance 125 to make his or her code changes in editor 112. Then, the programmer may synchronize his or her code changes out to the executing instance 125. To perform the synchronization, the code changes may be provided to a build management system 124 of a development environment server 120 of PaaS development environment. In one embodiment, the build management system 124 is a tool that abstracts the steps of building software packages from the programmer. One example of a build management system 124 is Tito, which manages RPM Package Manager (RPM)-based projects using Git as its source repository.

In one embodiment, the build management system 124 receives code changes and builds these changes into a correct packaging format (e.g., RPM) to be installed on the PaaS development environment instance 125. Packages are distributions of software, applications, and data. Packages also contain metadata, such as the software's name, description of its purpose, version number, vendor, checksum, and a list of dependencies necessary for the software to run properly. The build management system 124 may receive the code changes after the programmer runs a command at the editor 112 that causes the code changes to be sent to the build management system 124.

The build management system 124 may include mapping logic that allows the build management system 124 determine the portions of the PaaS product code base that should be rebuilt in light of the code changes, rather than rebuilding the entire code base. The build management system 124 standardizes the matching of packaging components to the code base of the PaaS product.

In one embodiment, the build management system 124 also interacts with the package management system 122 to install the built packages to corresponding locations in the code base. The build management system 124 may abstract one or more lower-level package management commands to be run to install the built packages and pass those commands to the package management system 122. Package management system 122 is a collection of software tools to automate the process of installing, upgrading, configuring, and removing software packages for a computer's OS in a consistent manner. The package management system 122 may maintain a database of software dependencies and version information to prevent software mismatches and missing prerequisites. In one embodiment, the package management tool 122 is RPM. As a result, the programmer making and submitting the code changes to the PaaS product may be unaware of which packages of the PaaS product code are affected by the code changes and also does not have to directly rebuild and install the PaaS product packages.

Once the package management system 122 installs the built packages resulting from the code changes, PaaS development environment instance 125 may be re-installed on VM 165. The programmer may then use the browser application 114 to verify whether the code changes affected the execution of the PaaS development environment instance 125. This provides a corresponding indication to the programmer of any problems or issues the code changes may cause to the PaaS product in the production-level environment.

Once a programmer has individually verified that his or her code changes are acceptable and did not negatively affect the PaaS development environment instance 125 launched for his or her individual development purposes, the code changes may then be submitted as a patch to be applied to a mainline repository of the PaaS development system 105. The mainline repositories include the code that a team of developers can view and access, and that may potentially go into a next stable build of the code base.

In one embodiment, the code changes are submitted as a patch to the source code management system 130. Source code management system 130 manages changes to source code by logically organizing and controlling the revisions to the source code into a source code repository 135. One example of a source code management system 130 is Git distributed version control system. A programmer intending to send code changes to the Git source code management system would submit a pull request to GitHub (a web-based hosting service for Git source code management system). In some embodiments, code changes may also be submitted via different mechanisms, such as sending a patch to a mailing list, or posting the patch to a message board, to name a few examples.

Once the source code management system 130 receives the patch with the code change, but prior to committing the code changes to the source code repository 135, a continuous integration (CI) system 140 is initiated to launch a battery of tests against the code changes. In one embodiment, the source code management system 130 calls the CI system 140 to initiate. The CI system 140 is a system that merges developer workspaces with a shared mainline at periodic intervals. In one embodiment, the CI system 140 launches a PaaS development environment instance 125 with the code changes synchronized into the instance 125 (per the discussion above), and then executes multiple tests against the instance 125 before the code changes can be merged into the source code repository 135. In one embodiment, the tests to run at the CI system 140 are configured by a system administrator of the PaaS development system 105. The tests may be executed by the CI system 140 without any human interaction.

In one embodiment, if the tests at the CI system 140 pass, then the patch is merged into the mainline source code repository 135 and a new PaaS development environment stable code base is generated. This new stable code base is used for future PaaS development environment instances 125. The patch may also be provided to another level of testing, such as a Quality Engineering team, which assesses readiness of the code changes for production level deployment. If a test fails at the CI system 140, then the patch is rejected and goes back to the programmer to determine what went wrong and provide a fix.

In one embodiment, untrusted test or merge requests are flagged by trusted users as testable or mergeable. This flag is added after the last change to the pull request. If a change to the pull request happens after CI system 140 testing starts, the merge does not occur and, instead, the change is retested (as long as there is a valid merge or test flag after the last commit). In one embodiment, trusted users are maintained with GitHub teams, where test/merge authority is given to particular GitHub teams for particular repositories. For merging changes, a queue of changes waiting to be merged may be maintained, where the changes in the queue are merged in serial. This provides stability to the master code base given that no two conflicting code changes can be tested separately and merged at the same time. Embodiments of the disclosure may also support co-requisites of pull requests, so if there are changes in multiple repositories that depend on each other they can be testes and merged at the same time.

FIG. 3 is a flow diagram illustrating a method 300 for using a multi-tier PaaS deployment that is reduced to a single-tier architecture for development purposes according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by a PaaS development environment, such as PaaS development system 105 of FIG. 1.

Method 300 begins at block 310 where the tiers of a multi-tier PaaS system are mapped to a single consolidated environment that is executable on a single VM. In one embodiment, the multiple tiers of the PaaS system are functionally separated by networking stacks of the VM. For example, a HTTP protocol networking stack may exist for communications between a client layer and a broker layer of the PaaS product. A messaging-based protocol network stack (e.g., AMQP or STOMP) may exist between the broker layer and a node layer of the PaaS product. In addition, a HTTP networking stack or SSH networking stack may exist between the client layer and the node layer.

At block 320, the single consolidated environment is provided as a PaaS instance to execute on a VM. In one embodiment, the PaaS instance is used by a programmer for development of the PaaS product. The programmer may use a browser application at a computing device of the programmer to verify that the PaaS instance is initialized and executing. Based on the executing behavior of the PaaS instance, the program may decide to change the code of the PaaS instance. At block 330, code changes to the PaaS instance are received. In one embodiment, the programmer may use a source code editor at his or her computing device to generate the code changes.

Subsequently, at block 340, the code changes are synchronized to the PaaS instance. In one embodiment, a build management system, such as Tito build management system, is responsible for synchronizing the changes. In one embodiment, the execution of the PaaS instance is stopped while the build management system synchronizes the code changes. Then, at block 350, packages of the PaaS instance that are affected by the code change are identified. The build management system may identify these packages by utilizing a mapping tool that correlates packages to corresponding sections of code repository.

At block 360, the identified packages of the PaaS instance are rebuilt. In one embodiment, the build management system interacts with a package management system, such as RPM, to perform the package rebuilding without any user (e.g., programmer, developer, system administrator) interaction. Lastly, at block 370, the PaaS instance, now including the rebuilt packages, is re-launched in the VM. In one embodiment, the programmer may then verify, via his or her browser application, that the PaaS instance is executing correctly with the code changes implemented.

Figure 4:
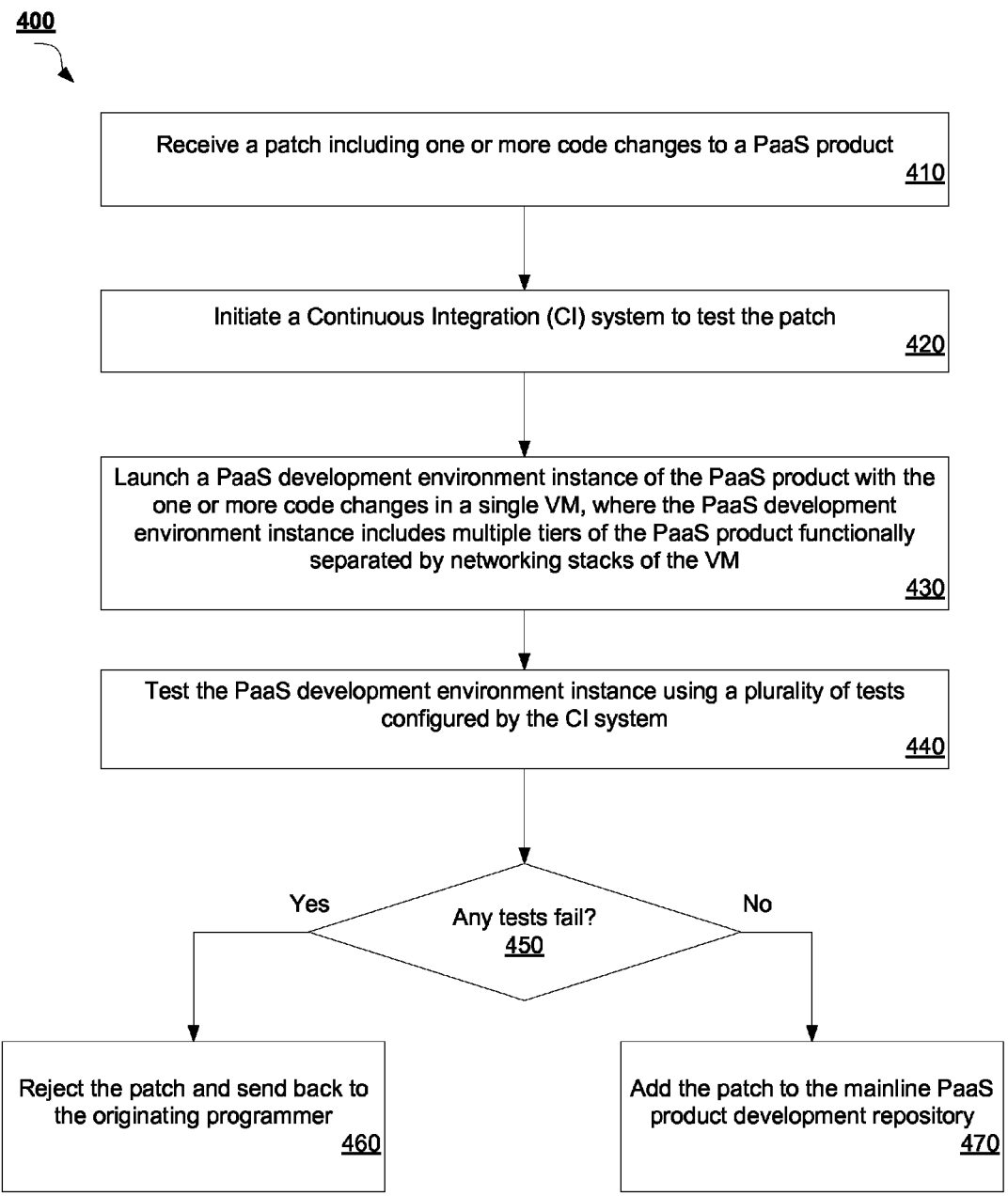
FIG. 4 is a flow diagram illustrating a method for patch-based verification using a multi-tier PaaS deployment that is reduced to a single-tier architecture according to an embodiment of the disclosure.

FIG. 4 is a flow diagram illustrating a method 400 for patch-based verification using a multi-tier PaaS deployment that is reduced to a single-tier architecture according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a PaaS development environment, such as PaaS development system 105 of FIG. 1.

Method 400 begins at block 410 where a patch is received that includes one or more code changes to a PaaS product. In one embodiment, the patch is received by a source code management system, such as Git source code management system or GitHub source code management system. In some embodiments, the patch is provided to the source code management system via a pull request. At block 420, a CI system is initiated to test the received patch.

At block 430, a PaaS development environment instance is launched in a single VM by the CI system, where the PaaS development environment instance includes the one or more code changes from the patch. In one embodiment, the PaaS development environment instance includes multiple tiers of the PaaS product, where the multiple tiers are functionally separated by networking stacks of the VM. For example, a HTTP protocol networking stack may exist for communications between a client layer and a broker layer of the PaaS product. A messaging-based protocol network stack (e.g., AMQP or STOMP) may exist between the broker layer and a node layer of the PaaS product. In addition, a HTTP networking stack or SSH networking stack may exist between the client layer and the node layer.

Subsequently, at block 440, the PaaS development environment instance is tested using a plurality of tests configured by the CI system. In one embodiment, the tests are selected by a system administrator of the CI system. Then, at decision block 450, it is determined whether any of the tests run by the CI system failed. If one or more tests failed, then method 400 proceeds to block 460 where the patch is rejected and sent back to the originating programmer for further development. In some embodiments, details of the tests failed are provided as feedback. If no tests failed at decision block 450, the method 400 proceeds to block 470 where the patch is accepted and added to a mainline PaaS product development repository. In one embodiment, the repository is maintained by the source code management system.

Figure 5:
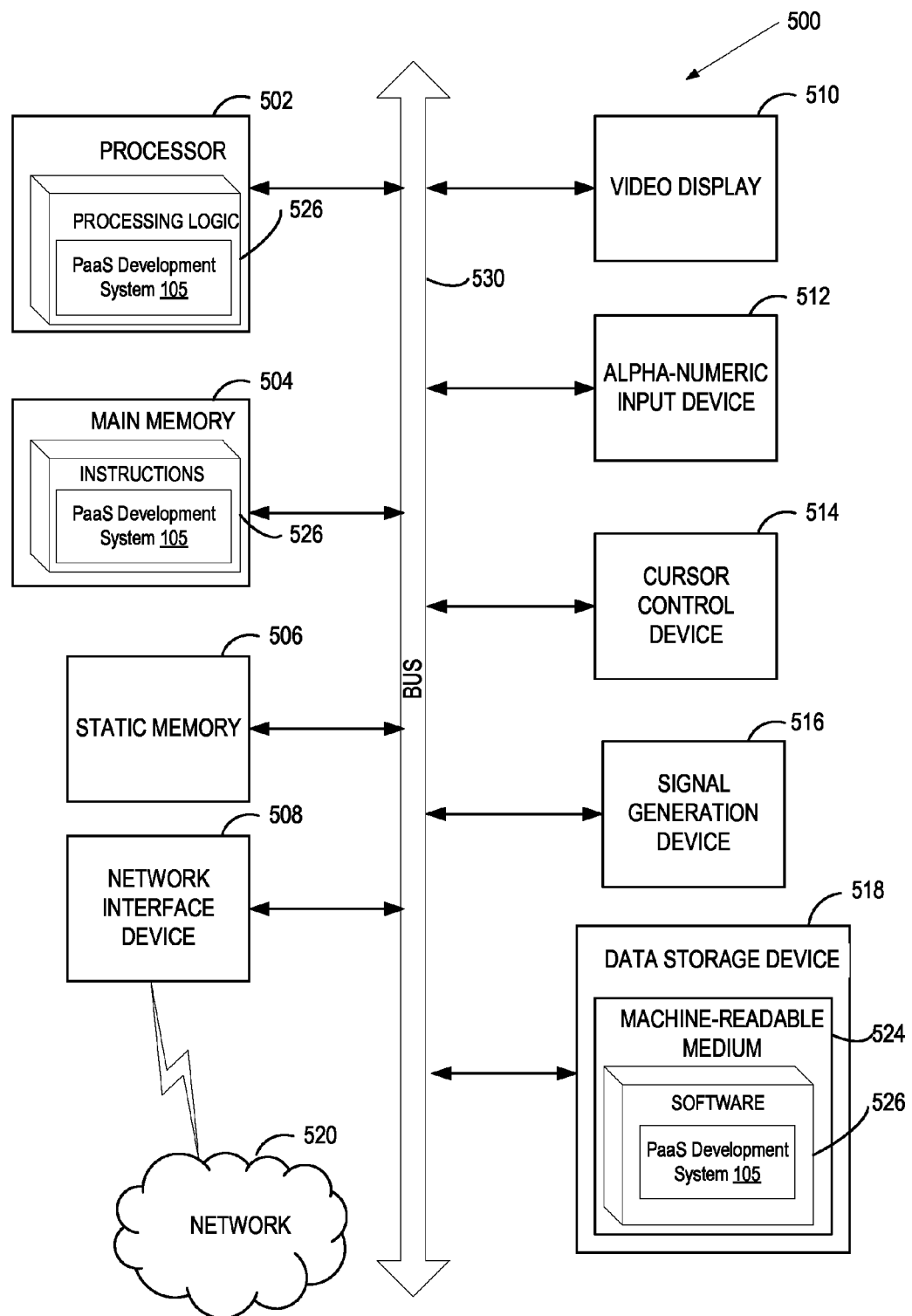
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512

(e.g., a keyboard), a cursor control device 514 (e.g., a mouse), and a signal generation device 516 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 to implement a PaaS development environment 105 to provide a multi-tier PaaS deployment that is reduced to a single-tier architecture for development purposes, such as the PaaS development environment 105 described with respect to FIG. 1, and/or a software library containing methods that call the above applications. While the machine-accessible storage medium 528 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "mapping", "providing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:

mapping, by a processing device, multiple tiers of a Platform-as-a-Service (PaaS) system to a consolidated environment executable on a virtual machine (VM), wherein networking stacks of the VM maintain a separation between the multiple tiers in the consolidated environment;

providing, by the processing device, the consolidated environment as a development instance of the PaaS system for execution on the VM, the consolidated environment facilitating testing of code changes to the PaaS system in view of a source code repository;

identifying, in view of a correlation between one or more packages and a section of the source code repository, a package of the development instance of the PaaS system that is affected by the code changes; and in view of an identification of the package of the development instance of the PaaS system that is affected by the code changes, rebuilding the package.

2. The method of claim 1, wherein the multiple tiers comprise a client tier, a broker tier, and a node tier, and wherein the PaaS system is a multi-tenant PaaS system that hosts a plurality of tenants on a same node.

3. The method of claim 2, wherein the networking stacks comprise a HyperText Transport Protocol (HTTP) networking stack between the client tier and the broker tier, a messaging-based protocol networking stack between the broker tier and the node tier, and a Secure Shell (SSH) networking stack between the client tier and the node tier.

4. The method of claim 1, further comprising receiving the code changes to a code base of the consolidated environment from the programmer.

5. The method of claim 4, further comprising integrating the received code changes into one or more packages of the consolidated environment and installing the integrated packages as a rebuilt consolidated environment on the VM.

6. The method of claim 5, wherein the integrating the received code changes further comprising rebuilding only the packages of the consolidated environment that are affected by the received code changes.

7. The method of claim 1, wherein the code changes are provided as a patch to a continuous integration (CI) system that utilizes the consolidated environment executed in the VM to automatically test the code changes without interaction from an end user.

8. The method of claim 7, wherein the patch is provided to the CI environment as a pull request using a GitHub source code management system.

9. A system, comprising:
a memory;
a processing device operatively coupled to the memory, the processing device to:
map multiple tiers of a Platform-as-a-Service (PaaS) system to a consolidated environment executable on a virtual machine (VM), wherein networking stacks of the VM maintain a separation between the multiple tiers in the consolidated environment;
provide the consolidated environment as a development instance of the PaaS system for execution on the VM, the consolidated environment to facilitate testing of code changes to the PaaS system in view of a source code repository;
identify, in view of a correlation between one or more packages and a section of the source code repository, a package of the development instance of the PaaS system that is affected by the code changes; and
in view of an identification of the package of the development instance of the PaaS system that is affected by the code changes, rebuild the package.

10. The system of claim 9, wherein the multiple tiers comprise a client tier, a broker tier, and a node tier, and wherein the PaaS system is a multi-tenant PaaS system that hosts a plurality of tenants on a same node.

11. The system of claim 10, wherein the networking stacks comprise a HyperText Transport Protocol (HTTP) networking stack between the client tier and the broker tier, a messaging-based protocol networking stack between the broker tier and the node tier, and a Secure Shell (SSH) networking stack between the client tier and the node tier.

12. The system of claim 9, wherein the PaaS development system comprises a build management system to integrate the code changes into one or more packages of the consolidated environment and install the integrated packages as a rebuilt consolidated environment on the VM.

13. The system of claim 12, wherein the integrating the code changes further comprising rebuilding only the packages of the consolidated environment that are affected by the code changes.

14. The system of claim 9, wherein the code changes are provided as a patch to a continuous integration (CI) system that utilizes the consolidated environment executed in the VM to automatically test the received code changes without interaction from an end user.

15. The system of claim 14, wherein the patch is provided to the CI environment as a pull request using a GitHub source code management system.

16. A non-transitory machine-readable storage medium comprising instructions that, when accessed by a processing device, cause the processing device to:
map, by the processing device, multiple tiers of a Platform-as-a-Service (PaaS) system to a consolidated environment executable on a virtual machine (VM), wherein networking stacks of the VM maintain a separation between the multiple tiers in the consolidated environment; and
provide, by the processing device, the consolidated environment as a development instance of the PaaS system for execution on the VM, the consolidated environment to facilitate testing of code changes to the PaaS system in view of a source code repository;
identify, in view of a correlation between one or more packages and a section of the source code repository, a package of the development instance of the PaaS system that is affected by the code changes; and
in view of an identification of the package of the development instance of the PaaS system that is affected by the code changes, rebuild the package.

17. The non-transitory machine-readable storage medium of claim 16, wherein the multiple tiers comprise a client tier, a broker tier, and a node tier, and wherein the PaaS system is a multi-tenant PaaS system that hosts a plurality of tenants on a same node.

18. The non-transitory machine-readable storage medium of claim 17, wherein the networking stacks comprise a HyperText Transport Protocol (HTTP) networking stack between the client tier and the broker tier, a messaging-based protocol networking stack between the broker tier and the node tier, and a Secure Shell (SSH) networking stack between the client tier and the node tier.

19. The non-transitory machine-readable storage medium of claim 16, wherein the processing device is further to:
integrate the code changes into one or more packages of the consolidated environment; and
install the integrated packages as a rebuilt consolidated environment on the VM.

20. The non-transitory machine-readable storage medium of claim 16, wherein the code changes are provided as a patch to a continuous integration (CI) system that utilizes the consolidated environment executed in the VM to automatically test the code changes without interaction from an end user.

* * * * *